US011858429B2

(12) United States Patent
Drueppel et al.

(10) Patent No.: US 11,858,429 B2
(45) Date of Patent: Jan. 2, 2024

(54) STRUCTURAL UNIT FOR PROVISION IN THE FRONT END OR TAIL END OF A MOTOR VEHICLE

(71) Applicant: HELLA GmbH & Co. KGaA, Lippstadt (DE)

(72) Inventors: Mathias Drueppel, Lippstadt (DE); Susanne Koehler, Lippstadt (DE); Werner Koesters, Lippstadt (DE); Christian Smarslik, Muenster (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 176 days.

(21) Appl. No.: 17/396,004

(22) Filed: Aug. 6, 2021

(65) Prior Publication Data

US 2021/0362646 A1 Nov. 25, 2021

Related U.S. Application Data

(63) Continuation of application No. PCT/EP2020/051852, filed on Jan. 27, 2020.

(30) Foreign Application Priority Data

Feb. 6, 2019 (DE) ..................... 10 2019 102 879.5

(51) Int. Cl.
*B60Q 1/04* (2006.01)
*B60Q 1/08* (2006.01)
(Continued)

(52) U.S. Cl.
CPC .......... *B60R 13/005* (2013.01); *B60Q 1/0483* (2013.01); *B60Q 1/085* (2013.01); *B60Q 1/2615* (2013.01); *B60Q 1/5035* (2022.05); *B60Q 1/543* (2022.05); *B60R 11/00* (2013.01); *B60R 11/0229* (2013.01); *B60R 11/0264* (2013.01); *B60R 11/04* (2013.01); *B60R 16/03* (2013.01); *B60S 1/566* (2013.01); *B60R 2011/004* (2013.01)

(58) Field of Classification Search
None
See application file for complete search history.

(56) References Cited

U.S. PATENT DOCUMENTS 10,427,644 B2 * 10/2019 Weghaus ................ B60R 25/24
10,908,271 B2 2/2021 Watanabe et al.
(Continued)

FOREIGN PATENT DOCUMENTS

DE 102005060400 A1 6/2007
DE 102009057825 A1 6/2011
(Continued)

OTHER PUBLICATIONS

International Search Report dated Mar. 30, 2020 in corresponding application PCT/EP2020/051852.

*Primary Examiner* — Ashok Patel
(74) *Attorney, Agent, or Firm* — Muncy, Geissler, Olds & Lowe , P.C.

(57) ABSTRACT

A structural unit for provision in the front end or in the tail end of a motor vehicle, wherein the structural unit comprises a support body and at least two environment sensing systems, wherein the environment sensing systems are received on the support body.

14 Claims, 1 Drawing Sheet

100 23 22 1 200 21 201 202 52 8 8 8 202 51 2

(51) Int. Cl.

| | |
|---|---|
| ***B60Q 1/26*** | (2006.01) |
| ***B60R 11/00*** | (2006.01) |
| ***B60R 11/02*** | (2006.01) |
| ***B60R 11/04*** | (2006.01) |
| ***B60R 16/03*** | (2006.01) |
| ***B60S 1/56*** | (2006.01) |
| ***B60Q 1/50*** | (2006.01) |
| ***B60R 13/00*** | (2006.01) |

(56) References Cited

U.S. PATENT DOCUMENTS

| | | | | |
|---|---|---|---|---|
| 2016/0121784 | A1 | 5/2016 | Kaatrasalo et al. | |
| 2018/0364077 | A1* | 12/2018 | Alves | G01D 11/30 |
| 2020/0300964 | A1* | 9/2020 | Kasaba | G01S 17/931 |
| 2021/0129625 | A1* | 5/2021 | Donboli | G08B 21/24 |

FOREIGN PATENT DOCUMENTS

| | | | |
|---|---|---|---|
| DE | 10-2010-055113 | * | 7/2011 |
| DE | 102010028185 | A1 | 10/2011 |
| DE | 102012006368 | A1 | 10/2012 |
| DE | 102015210449 | A1 | 12/2016 |
| DE | 102016010441 | A1 | 2/2017 |
| DE | 102016218079 | B3 | 12/2017 |
| DE | 102017208893 | A1 | 11/2018 |
| DE | 102018005317 | A1 | 1/2020 |
| GB | 2561531 | A | 10/2018 |
| WO | WO2018056125 | A1 | 3/2018 |

* cited by examiner

STRUCTURAL UNIT FOR PROVISION IN THE FRONT END OR TAIL END OF A MOTOR VEHICLE

This nonprovisional application is a continuation of International Application No. PCT/EP2020/051852, which was filed on Jan. 27, 2020 and which claims priority to German Patent Application No. 10 2019 102 879.5, which was filed in Germany on Feb. 6, 2019 and which are both herein incorporated by reference.

BACKGROUND OF THE INVENTION

Field of the Invention

The present invention relates to a structural unit for provision in the front end or in the tail end of a motor vehicle.

Description of the Background Art

In the course of the development of driver assistance systems and autonomous vehicles, there is an increasing need to integrate sensors for detecting the environment around a vehicle into the vehicles. The sensor technology is used to detect objects in the vehicle environment with regard to their size, their position and their state of motion. Especially lidar systems (abbreviation for light detection and ranging), radar systems and cameras are used as environment sensing systems, which are installed both individually and in a plurality and/or in combination with each other in the vehicles. In the prior art, these environment sensing systems are arranged in different positions in the vehicle periphery.

For example, DE102010028185A1 discloses a vehicle having a radar device which is arranged in a recess in a body part, in particular in a bumper or in a fender or in a body part in the front or tail end.

A vehicle with two radar sensors is disclosed in DE102012006368A1, wherein the radar sensors are integrated in the right and left outer regions of the rear shock absorber.

DE102015210449B4 discloses a vehicle with a camera, which is integrated into a roof antenna in the tail area of the vehicle.

DE102016218079B3 discloses a vehicle comprising a camera for an assistance system, wherein the camera and/or a radar sensor are arranged at least partially in and/or behind the manufacturer's emblem.

DE102017208893A1 discloses a vehicle comprising a lidar device which is arranged on a safety structure of the vehicle above the head position of the driver, for example on a roll-over bar.

In addition, predominantly shown in vehicle studies and vehicle prototypes are headlight integrated solutions in which the environment sensing systems are integrated into the headlights and/or the tail lights of the vehicles.

A disadvantage of integrating environment sensing systems in vehicles according to the state of the art, in particular when combining a plurality of environment sensing systems, is the high cost which is created for the structural unit, adjustment and contacting of the individual components in the various installation positions. In addition, the degree of individualization of the vehicle components designed to receive the environment sensing systems is necessarily high, which adversely affects the versatility of the components. Furthermore, integrating the environment sensing systems into the various vehicle components can lead to severe limitations in the design of the components. For example, when integrating into vehicle headlights, the headlamp housings must have a minimum size so as to ensure that the environment sensing systems have sufficient space in the headlights or tail lights. This is extremely disadvantageous, as headlights and tail lights are increasingly being reduced for design reasons.

SUMMARY OF THE INVENTION

It is therefore an object of the present invention to provide an integration of environment sensing systems in the front or tail end of motor vehicles by means of which the disadvantages of the prior art are overcome, which in particular allow for the system components to be installed in a more practical manner and in the process enhance freedom of design for the vehicle components in the front and tail end.

This object is achieved on the basis of a structural unit for provision in the front end or in the tail end of a motor vehicle.

The invention includes the technical teaching that the structural unit comprises a support body and at least two environment sensing systems, wherein the environment sensing systems are received on the support body.

The invention is based on the idea of creating a new component as a central component of the front or tail of a vehicle, which brings all sensor components together in a compact unit. All components of the environment sensing systems are arranged in a common installation space, whereby the other components of the front or tail end, such as the headlights or tail lights, which are challenging from a design point of view, are freed of components, which today can only be easily integrated with great effort in terms of design. In particular, the headlights can thus be designed to be much smaller, in line with the current trend. The support body according to the invention advantageously receives the environment sensing systems in a housing-like manner and is integrated into the front or tail end of the vehicle. The environment sensing systems can therefore first be mounted in the support body and pre-adjusted, and subsequently the structural unit formed of support body and environment sensing systems can be mounted on the vehicle as a whole in a single work step.

The structural unit according to the invention comprises two housings for lighting devices, wherein the housings are detachably connected to the support body. In particular, these lighting devices represent the front headlights or the tail lights of the vehicle and the inventive structural unit is arranged centrally between them. Placing the support body across the center of the vehicle allows for the integration of the environment sensing systems at the front of the vehicle. Due to the detachability of the connection between the support body and the housings and based on a uniform design of the support body, structural units with different housings can be assembled so that different vehicle types can be equipped with identical support bodies.

The structural unit can also comprises a control device for controlling light functions of the lighting devices, wherein the control device is received on the support body and wherein the structural unit in each case comprises a feed-through and/or an electrical interface between the support body and the housings of the lighting devices such that the control device can be electrically connected to the lighting devices. By relocating the control devices from the housings of the lighting devices to the support body, the headlights or tail lights become more variable in terms of their construction and design. By means of a mechanical/electrical interface between the support body and the headlight, very small gap dimensions can be achieved, for example, in order to place an almost invisibly divided front panel or pane in front of the front end.

Furthermore, the structural unit advantageously comprises a front cover which is detachably connected to the support body, wherein the front cover is made of a material which is transparent to electromagnetic radiation and/or sectionally comprises at least one exchangeable pane. The front cover serves to protect the sensors and other components installed in the structural unit from harmful environmental influences during driving, but is at the same time transparent for the measurement signals of the environment sensing systems; for example, the front cover is made of polycarbonate. Alternatively or additionally, interchangeable panes, in particular made of mineral glass, are provided on the front cover in front of the environment sensing systems. In the event of impairment of the sensor system due to damage to the front cover, this detachably connected component can be replaced entirely or the affected pane can be replaced.

The structural unit with front cover can comprises at least one cleaning system for cleaning the front cover. This is advantageous since soiling, for example by spray water whirled up during driving, can severely impair the functionality of the sensors arranged in the structural unit. The cleaning system can be designed, for example, as a mechanical system, for example in the form of a wiper, or also as high-pressure washing nozzles.

The structural unit can comprises at least one display, wherein the display is detachably connected to the support body. In vehicles in highly automated driving operation, such a display is used to inform other road users about the operating state of the vehicle or it can be used as a design element, for example, to display a welcome message for the driver.

The structural unit can also comprise a central interface for connecting to onboard electrical and electronic systems of the motor vehicle, wherein the central interface is received on the support body. With such a central interface, it is possible to pre-assemble all components of the structural unit to a large extent, and the contact with the onboard electrical systems takes place in one work step when the structural unit is installed in the vehicle.

The environment sensing systems contained in the structural unit are designed in each case as a lidar system and/or as a radar system and/or as a camera, wherein a combination of at least two identical environment sensing systems is possible. Infrared systems can also be integrated into the structural unit as optical sensors for sensing the environment.

The structural unit comprises at least two different types of environment sensing systems, for example a combination of lidar, radar and camera, which are arranged in the support body as a shared housing.

The present invention further relates to a motor vehicle, wherein a structural unit is arranged in the front end and/or in the tail end of the motor vehicle, wherein the structural unit comprises a support body and at least two environment sensing systems, wherein the environment sensing systems are received on the support body. In this case, the structural unit is advantageously designed as one of the above embodiments.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
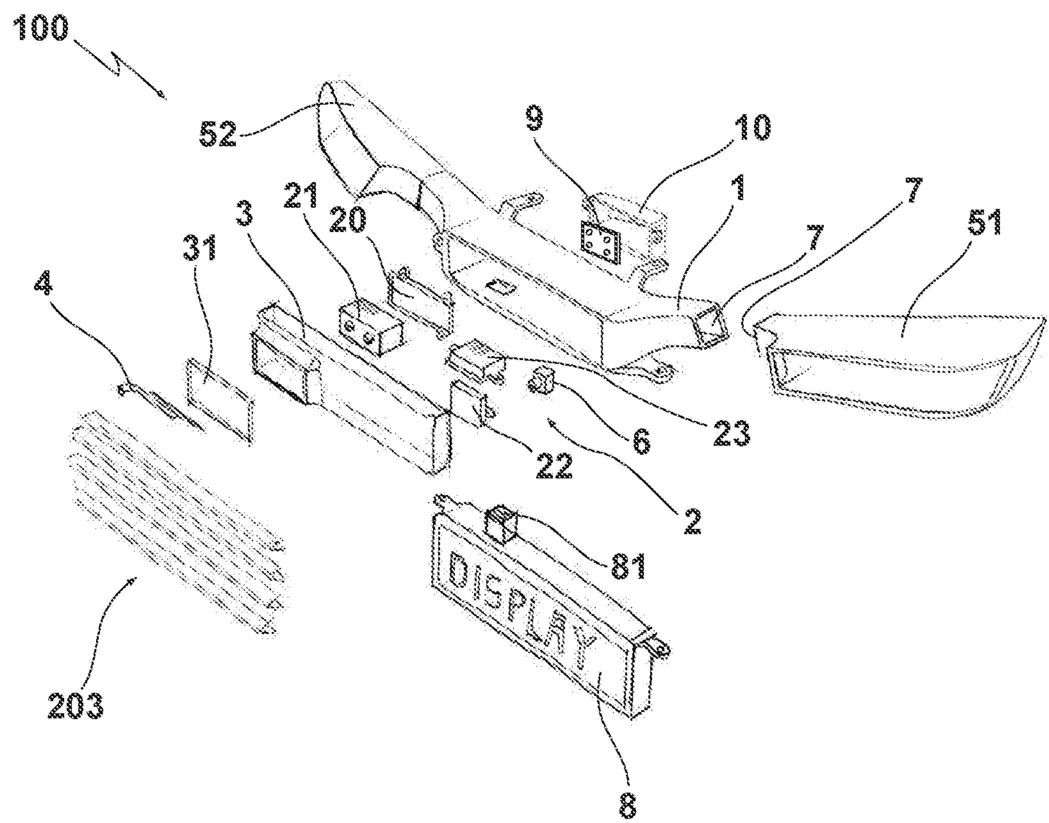
FIG. 1 shows a schematic exploded view of a structural unit according to the invention.

FIG. 1 shows an exploded view of a structural unit 100 according to the invention for provision in the front end of a motor vehicle. The housing-like support body 1 has in its interior the installation space for receiving the environment sensing systems 2, the control device 6 and the central interface 9. The structural unit 100 is connected centrally in the front end of the vehicle by means of the webs and lugs formed on the support body 1. The environment sensing systems 2 comprise a lidar sensor 21 including an associated adjustment frame 20, a radar sensor 22 and a camera 23. The adjustment frame 20 is used for fine adjustment of the lidar sensor 21, since the orientation of the sensor 21 for correct long-range detection must be carried out with arcsecond precision. Alternatively, the aforementioned sensors (21, 22, 23) can each be positioned on a separate or a common adjustment frame (20). The protective front cover 3, which is sealed with the support body 1, is arranged in front of the environment sensing systems in the direction of travel. Said front cover is made of, for example, polycarbonate and is thus permeable to the electromagnetic measuring signals of the environment sensing systems 2. Since the laser signal of the lidar sensor 21 would already be scattered with fine scratches on the surface of the front cover 3, the front cover 3 has a recess in the area in front of the lidar sensor 21, in which recess a pane 31, which can be exchanged if necessary and which is preferably made of mineral glass, is received. In addition, a cleaning system 4 in the form of a mechanical wiper is also fitted in this area, which cleans the pane 31 of equally light-scattering or light-absorbing impurities. At the side of the support body 1 are the detachably connected housings 51, 52 for accommodating the headlights. The connection points between the support body 1 and the housings 51, 52 are designed as feedthroughs 7 in the form of hollow profiles. Cables for electrically connecting the headlights to the control device 6, which is arranged in the support body 1 to control the light functions of the headlights, can be guided through the feedthroughs 7. Below the support body 1, the structural unit 100 has the display 8, which is detachably connected to the support body 1, wherein the feedthrough 81 is used for electrically contacting the display 8. In an alternative embodiment, the displays can also be integrated in the support body, so that the front cover also covers the displays. The central interface 9 is used for contacting the onboard electrical and electronic systems. The central interface comprises contacts and connections for all electrical or electronic components included in the structural unit 100. The tail cover for closing the support body 1, which is arranged behind the central interface, has suitable electrical feedthroughs for establishing contact between the central interface 9 and the onboard electrical systems. Alternatively, cable connections from the respective components of the structural unit can also be routed through the tail cover 10 by omitting a central interface 9. The closure of the vehicle front end is formed by a vehicle-specific design cover 203 or alternatively by another design element, such as a windshield.

Figure 2:
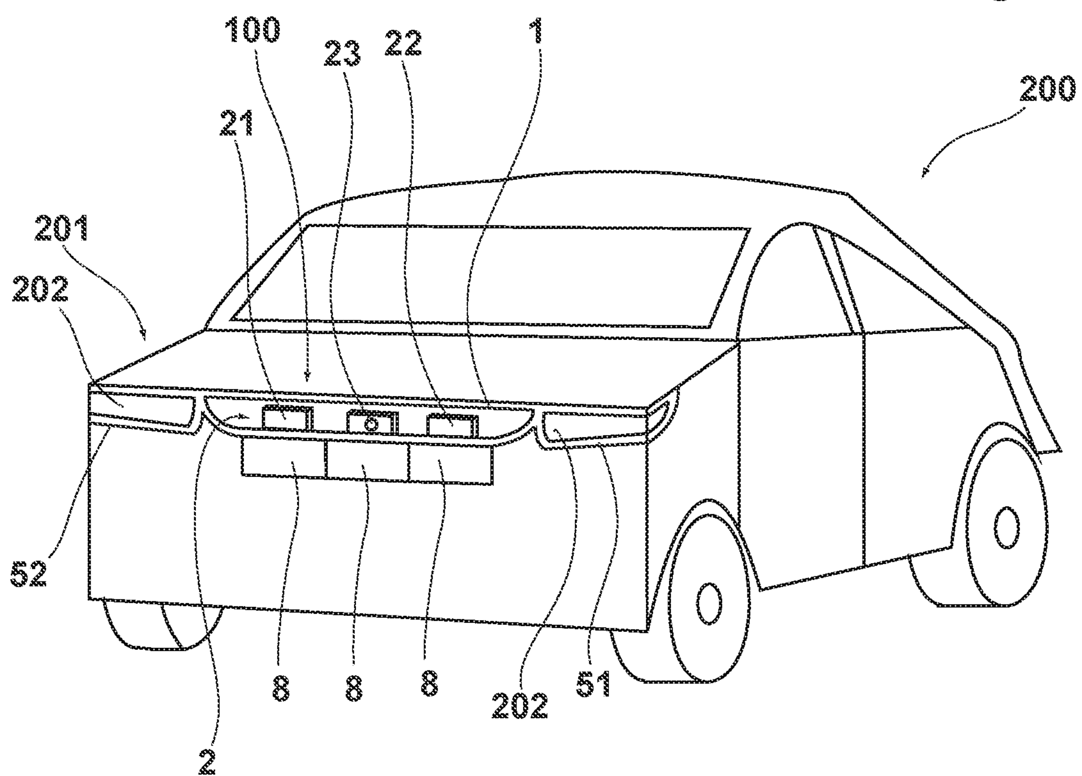
FIG. 2 shows a schematic view of a motor vehicle according to the invention.

FIG. 2 shows a schematic front view of a motor vehicle 200 according to the invention having a structural unit 100 according to the invention provided in the front end 201. The closure of the front end 201, that is, a cover or another design element, is not drawn for purposes of clearer presentation. In this case, the environment sensing systems 2 and 100, which are received in the support body 1, comprise a lidar sensor 21, a radar sensor 22, and a centrally disposed camera 23. Three displays 8 are arranged below the support body 1. The housings 51, 52 for the headlights 202, which are connected laterally to the support body 1, are of very small dimensions thanks to the inventive integration of all sensors 2 into the support body 1. The entire structural unit 100 thus occupies a central area of the front end 201 of the vehicle 200 and can be equipped according to requirements due to its modular character. For example, in the case of provision on a vehicle with an internal combustion engine, there are boundary conditions with regard to ensuring an adequate supply of cooling air into the engine block, whereas in the case of an electrically powered vehicle there is greater freedom with regard to the design of the structural unit 100.

The design of the invention is not limited to the preferred embodiments described above. Rather, a number of variants are conceivable, which make use of the presented solution even with fundamentally different versions. All features and/or advantages deriving from the claims, description or drawings, including design details and spatial arrangements, may be essential to the invention, both individually and in a wide variety of combinations.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A structural unit for arrangement in a front end or in a tail end of a motor vehicle, the structural unit comprising:
- a support body;
- at least two environment sensing systems; and
- at least one display,
- wherein the at least two environment sensing systems are arranged on the support body, and
- wherein the at least one display is detachably connected to the support body.

2. The structural unit according to claim 1, wherein the structural unit comprises two housings for lighting devices, and wherein the two housings are detachably connected to the support body.

3. The structural unit according to claim 2, wherein the structural unit comprises a control device for controlling and data processing the at least two environment sensing systems and for controlling light functions of the lighting devices, wherein the control device is received on the support body, wherein each of the housings of the two lighting devices are connected to the support body by a feedthrough, and wherein an electrical interface is provided in each feedthrough to electrically connect the control device to each of the two lighting devices.

4. The structural unit according to claim 1, wherein the structural unit comprises a front cover that is detachably connected to the support body, wherein the front cover is made of a material transparent to electromagnetic radiation and comprises at least one exchangeable pane in some sections.

5. The structural unit according to claim 4, wherein the structural unit comprises at least one cleaning system for cleaning the front cover.

6. The structural unit according to claim 1, wherein the at least two environment sensing systems comprise at least two different types of environment sensing systems.

7. The structural unit according to claim 1, wherein the structural unit comprises a central interface for connecting to onboard electrical and electronic systems of the motor vehicle, and wherein the central interface is received on the support body.

8. The structural unit according to claim 1, wherein the at feast two environment sensing systems comprise at least one radar system.

9. The structural unit according to claim 1, wherein the at least two environment sensing systems comprise at least one lidar system.

10. The structural unit according to claim 1, wherein the at least two environment sensing systems comprise at least one camera.

11. A motor vehicle comprising a structural unit disposed in at least one of a front end or a tail end of the motor vehicle, wherein the structural unit comprises a support body, at least one display and at least two environment sensing systems, wherein the at least two environment sensing systems are received on the support body, and wherein the at least one display is detachably connected to the support body.

12. The motor vehicle according to claim 11, wherein the structural unit comprises two housings for lighting devices, and wherein the two housings are detachably connected to the support body.

13. A structural unit for arrangement in a front end or in a tail end of a motor vehicle, the structural unit comprising:
- a support body;
- at least two environment sensing systems; and
- a front cover that is detachably connected to the support body,
- wherein the at least two environment sensing systems are arranged on the support body, and
- wherein the front cover is made of a material transparent to electromagnetic radiation and comprises at least one exchangeable pane that is detachable from the front cover.

14. The structural unit according to claim 13, wherein the at least one exchangeable pane is made of mineral glass.

* * * * *